United States Patent [19]
Windig et al.

[11] Patent Number: 5,841,891
[45] Date of Patent: Nov. 24, 1998

[54] IMAGE ANALYSIS USING THE DIRECT EXPONENTIAL CURVE RESOLUTION ALGORITHM

[75] Inventors: Willem Windig; Brian J. Antalek, both of Rochester, N.Y.

[73] Assignee: Eastman Kodak Company, Rochester, N.Y.

[21] Appl. No.: 832,424

[22] Filed: Apr. 2, 1997

[51] Int. Cl.[6] .................................................... G06K 9/00
[52] U.S. Cl. ........................ 382/131; 324/312; 382/276
[58] Field of Search .................................. 382/131, 276, 382/154, 293, 128; 600/410, 425; 128/920, 922; 324/312, 307

[56] References Cited

U.S. PATENT DOCUMENTS

| | | | |
|---|---|---|---|
| 4,556,847 | 12/1985 | Aspiotis et al. | 324/307 |
| 4,628,262 | 12/1986 | Maudsley | 324/309 |
| 4,803,432 | 2/1989 | Perman | 324/309 |
| 5,302,897 | 4/1994 | Tache et al. | 324/307 |
| 5,317,262 | 5/1994 | Moonen et al. | 324/309 |
| 5,319,308 | 6/1994 | Dechene et al. | 324/307 |
| 5,367,260 | 11/1994 | Dechene et al. | 324/307 |
| 5,397,987 | 3/1995 | Garritano | 324/307 |
| 5,408,181 | 4/1995 | Dechene et al. | 324/307 |
| 5,420,508 | 5/1995 | Smith | 324/307 |
| 5,530,350 | 6/1996 | Dechene et al. | 324/306 |

OTHER PUBLICATIONS

K.F. Morris, C.S. Johnson Jr., Journal of the American Chemical Society, vol. 115, 1993, pp. 4291–4299.

P. Stilbs, K. Paulsen, P.C. Griffiths, J. Phys., Chem., vol. 100, 1996, pp. 8180–8189.

B. Antalek, W. Windig, Journal of the American Chemical Society, vol. 118, 1996, pp. 10331–10332.

M. Kubista, Chemometrics and Intelligent Laboratory Systems, vol. 7, 1990, pp. 273–279.

I. Scarminio, M. Kubista, Analytical Chemistry, vol. 65, 1993, pp. 409–416.

K.S. Booksh, B.R. Kowalski, Journal of Chemometrics, vol. 8, 1994, pp. 287–292.

E. Sanchez, B.R. Kowalski, Analytical Chemistry, vol. 58, 1988, pp. 496–499.

B. Wilson, E. Sanchez, B.R. Kowalski, Journal of Chemometrics, vol. 3, 1989, 493–398.

C.–N. Ho, G.D. Christian and E.R. Davidson, Analytical Chemistry, vol. 50, 1978, pp. 1108–1113.

C.–N. Ho, G.D. Christian and E.R. Davidson, Analytical Chemistry, vol. 52, 1980, pp. 1071–1079.

C.–N. Ho, Q.D. Christian and E.R. Davidson, Analytical Chemistry, vol. 53, 1981, pp. 92–96.

M.M.C. Ferreira, M.L. Brand M.M.C. Ferreira, K.S. Booksh, W.C. Dolowy, Gouterman and B.R. Kowalski, Applied Spectroscopy, vol. 49, 1995, pp. 1317–1325.

L.S. Ramos, E. Sanchez and B.R. Kowalski, Journal of Chromatography, vol. 385, 1987, pp. 165–180.

J. Ohman, P. Geladi and S. Wold, Residual Bilinearization, Journal of Chemometrics, vol. 4, 1990, pp. 135–146.

(List continued on next page.)

*Primary Examiner*—Joseph Mancuso
*Assistant Examiner*—Vikkram Bali
*Attorney, Agent, or Firm*—William F. Noval

[57] ABSTRACT

A method of enhancing a series of images comprising the steps of: providing x digital image files, each image file including a matrix of n rows×m columns of pixels; producing a matrix of the x digital image files of x rows of m×n pixels per row, where each row is an unfolded image of an x digital image; splitting the produced matrix into two data sets A and B, each data set with an equal amount of images less than x; applying singular value decomposition (SVD) to data set A and limiting the SVD space to a number of expected components; calculating the projections $A^p$ and $B^p$ of data set A and data set B into the SVD space of A, with the eigenvalues of the SVD representing the projection of A; calculating the eigenvalues and eigenvectors of the product of $A^p$ and the inverse of $B^p$; and transforming the results of the latter calculation back to the original data set and calculating the resolved images and their contributions into the original images.

4 Claims, 5 Drawing Sheets

OTHER PUBLICATIONS

M. Josefson, L. Tekensbergs–Hjelte, Multicomponent Analysis: A Case Report, Journal of Pharmaceutical and Biomedical Analysis, vol. 9, 1991, pp. 643–654.

M.J.P. Gerritsen, H. Tanis, B.G.M. Vandeginste, G. Kateman, Analytical Chemistry, vol. 64, 1992, pp. 2042–2056.

M.J.P. Gerritsen, H. Peters, B.G.M. Vandeginste, G. Kateman, Chemometrics and Intelligent Laboratory Systems, vol. 18, 1993, pp. 205–119.

J.M. Henshaw, L.W. Burgess, K.S. Booksh and B.R. Kowalski, Analytical Chemistry, vol. 66, 1994, pp. 3328–3336.

T. Sandor, A.R. Bleier, P.W. Ruenzel, D.F. Adamns, F.A. Jolesz, Magnetic Resonance Imaging, vol. 6, 1988, pp. 27–40.

H. Grahn, N.M. Szeverenyi, M.W. Roggenbuck, F. Delaglio, P. Geladi, Chemometrics and Intelligent Laboratory Systems, vol. 5, 1989, pp. 311–322.

H. Grahn, N.M. Szeverenyi, M.W. Roggenbuck, P. Geladi, Chemometrics and Intelligent Laboratory Systems, vol. 7, 1989, pp. 87–93.

H.F. Grahn, J. Saaf, Chemometrics and Intelligent Laboratory Systems, vol. 14, 1992, pp. 391–396.

L.M. Fletcher, J.B. Barsotti, J.P. Hornak, Magnetic Resonance in Medicine, vol. 29, 1993, pp. 623–630.

IMAGE ANALYSIS USING THE DIRECT EXPONENTIAL CURVE RESOLUTION ALGORITHM

FIELD OF THE INVENTION

This invention relates to a method designed to enhance a series of images, such as clinical Magnetic Resonance Images (MRI's) possessing an exponential dependency by extracting underlying images with pure exponential changes using a fast algorithm. This method compresses the information of the original images into fewer images between which the differences are maximized, while preserving all of the information in the original data set.

BACKGROUND OF THE INVENTION

Magnetic Resonance Imaging (MRI)

MRI is an imaging modality which is used predominantly in a clinical setting for obtaining spatial information of human anatomy. It is a powerful technique for visualizing tissue pathology. MRI is used to a lesser extent for materials imaging. The non-invasive nature of MRI makes it particularly useful to probe diffusion processes, material components, and materials properties without disturbing the sample. MRI is an extension of the spectroscopic technique generally referred to as Nuclear Magnetic Resonance (NMR) which provides structural detail of molecules in solution.

In clinical MRI, image contrast of various tissue types is accomplished due to the fact that the hydrogen nuclei ($^1H$) within these tissues posses intrinsic properties which result in unique signal response. These properties are described by two constants of the $^1H$ nuclei, $T_1$ and $T_2$, which define the rate about which the signal decays back to an equilibrium value after excitation. The relationship between the constant and the signal is exponential. Another tissue property involves the spatial density of the $^1H$ nuclei, $\rho$. A higher value for $\rho$ within a given region of space will give a proportionately (linear) higher signal intensity in the image. Water self-diffusion ($D_w$) within a tissue type is a fourth property which also gives rise to image contrast and is also related to the signal intensity with an exponential. Several parameters are varied in a typical MRI experiment to obtain an optimal contrast for a specific anatomy. For materials imaging, image contrast may occur for different material types or for different material properties, such as localized stress or component diffusion.

Figure 1:
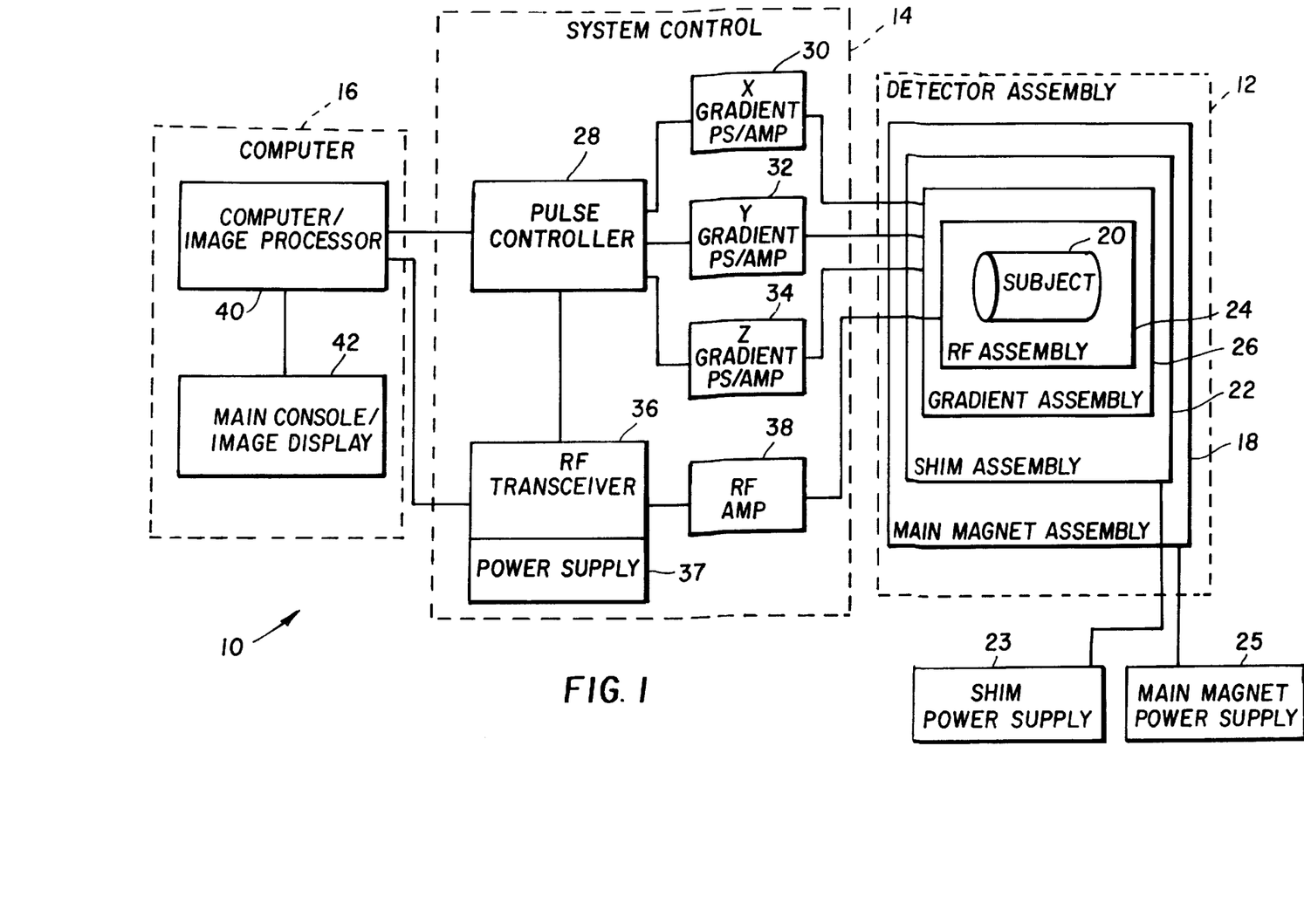
FIG. 1 is a block diagram of an MRI system which can incorporate the present invention.

FIG. 1 represents a schematic of the main components of an MRI system 10, which includes magnet and detector assembly 12, system control 14, and computer 16. MRI utilizes several devices to create an image. A magnet 18 is used to create a large, static, homogeneous field which polarizes the $^1H$ nuclei within the subject 20 to be imaged. A shim coil assembly 22 is generally used to trim the magnetic field for the optimum homogeneity. A radio frequency (RF) antenna 24 is used to irradiate the subject 20, thereby exciting the $^1H$ nuclei, and collecting an RF signal as the nuclei relax to an equilibrium state. A series of three orthogonal magnetic field gradient coils 26 provide a means to obtain spatial information. These devices are contained within the magnet and detector assembly 12 and are powered with their respective power supplies 23 and 25. A system control section 14 contains several devices which control the electronic properties of the RF and gradient pulses. A pulse controller 28 connects to three gradient power supplies and amplifiers 30, 32, 34, which control the output of all gradient coils. The pulse controller 28 also controls the output of the RF transceiver 36 with power supply 37. The RF amplifier section 38 is controlled for both excitation power and receiver gain. A computer system 16 is used to interface with the pulse controller 28 using acquisition parameters, and reconstruct, display, and store the resultant images. System 16 includes computer/image processor 40 and main console/image display 42. Full instrument control is accessible through the main console 42.

The MRI operator selects from a variety of MRI experiments. These experiments, called pulse sequences, control the hardware to provide precisely controlled RF and gradient pulses which are used to condition and excite the $^1H$ nuclei within the object An image is created by processing the collected, digitized RF signals.

The MRI signal acquired through use of a pulse sequence called pulsed gradient spin echo (PGSE) is related to the four constants, $T_1$, $T_2$, $\rho$, and $D_w$, by the following equation:

$$S \propto \rho e^{-TE/T_2}(1-e^{-TR/T_1})e^{-D_w(g\gamma\delta)^2\Delta} \quad (1)$$

where $\gamma$ is a physical constant of the $^1H$ nucleus. The parameters TE, TR, g, $\delta$, and $\Delta$ are timing values within the pulse sequence which can be programmed to give the desired signal intensity variation and contrast within an image. These parameters may also be varied in a systematic way to probe the value of one or more of the constants, $T_1$, $T_2$, $\rho$, and $D_w$. For example, by choosing a short TE (TE<<$T_2$), a long TR (TR >>$T_1$), and g=0, one can obtain an image which is weighted according to $T_2$. If one obtains a series of images where the value of TE is varied, an image containing a true spatial distribution of $T_2$ can be, in principle, created.

Anomalous (pathological, etc.) tissue usually gives different contrast compared to healthy tissue for a variety of reasons. A single image produced with an appropriate set of acquisition parameters can provide qualitative information of components within a region of space. A series of multivariate images, processed appropriately, can provide quantitative information of components within a region of space by utilizing differences in the constants $T_1$, $T_2$, $\rho$, or $D_w$ for the various tissue types. For example, in a clinical setting, quantifying tissue regions will lead to the classification of specific tissue. This process is useful in diagnosing the type and spatial extent of a specific pathology.

Figure 2:
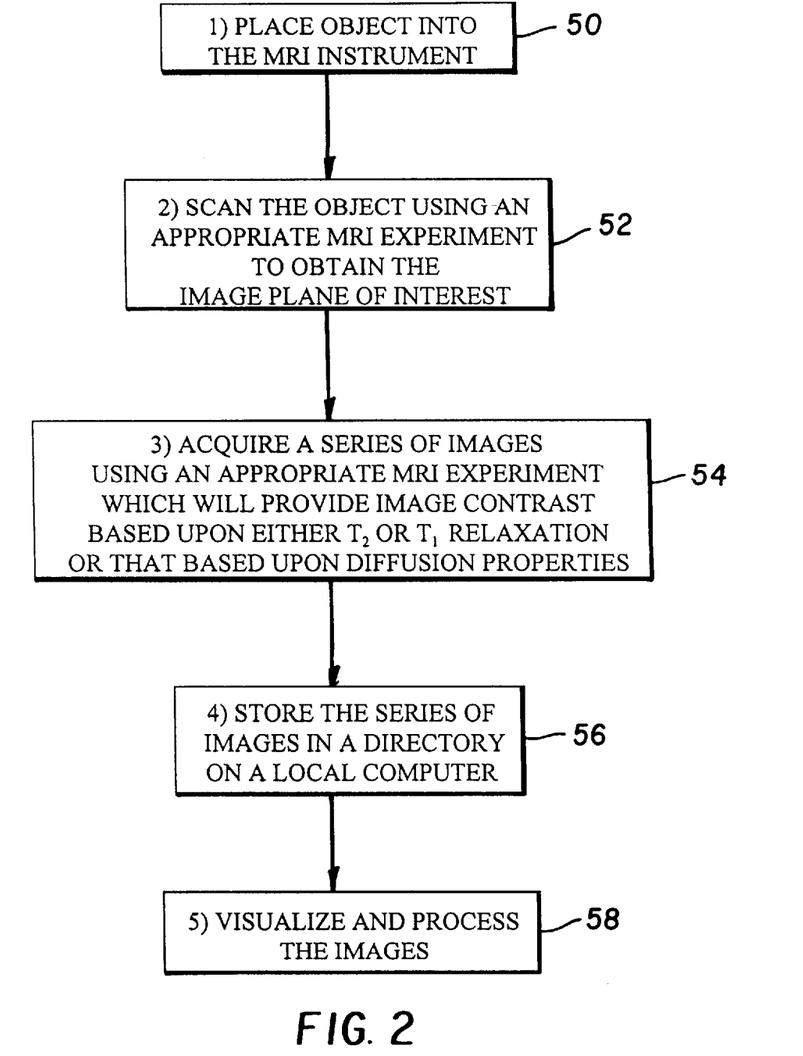
FIG. 2 is a flow diagram of the MRI experiment.

FIG. 2 shows a flow diagram describing the MRI process. As shown, the process includes the following steps:
1) place object into the MRI instrument (box 50);
2) scan the object using an appropriate MRI experiment to obtain the image plane of interest (box 52);
3) acquire a series of images using an appropriate MRI experiment which will provide image contrast based upon either $T_2$ or $T_1$ relaxation or that based upon diffusion properties (box 54);
4) store the series of images in a directory on a local computer (box 56); and
5) visualize and process the images (box 58).

Prior art methods have involved iterative fitting procedures or principal component analysis (PCA) to obtain the information and generally are time consuming, subjective, and approximate.

NMR spectral analysis

In order to illustrate the data processing approach, the analysis of NMR spectra is briefly described in this section and subsequently followed with a description of the MR image analysis. The exponential character of NMR signals has been utilized to visualize related variables (ppm values) in a series of spectra, e.g. the DOSY technique (K. F. Morris, C. S. Johnson Jr., J. Am. Chem. Soc. 115, 1993, 4291–4299). The next step in data analysis is to resolve the spectra into the pure components and their respective exponential contributions in the original spectra, which is done by the CORE (COmponent REsolved) technique (P. Stilbs, K. Paulsen, P. C. Griffiths, J. Phys., Chem., 100, 1996, 8180–8189.). This technique fits (linear combinations of) exponential functions. Once the proper exponential contributions in each of the mixture spectra are known, the spectra can be resolved.

A recent technique developed by Antalek and Windig (B. Antalek, W. Windig, J.Am.Chem, Soc,, 118, 1996, 10331–10332) enables resolution of MR spectral data in seconds. Furthermore, the method obtains a direct solution for the exponentials; no iterative methods are used to fit the data. The principles are outlined below.

Kubista showed that mixture data can be resolved when two data sets are available with the following relation (K. S. Booksh and B. R. Kowalski, J. Chemom. 8 (1994) 287–292; I. Scarminio and M. Kubista, Anal. Chem. 65 (1993) 409–416):

$$A = CP^T \quad (2)$$

$$B = C\alpha P^T \quad (3)$$

A and B are data matrices of size s*v; s is the number of spectra and v is the number of variables (e.g., wave numbers). C (size s*n) and P (size n*v) are the concentration and pure spectra matrices of n components. The matrix a is a diagonal matrix (size n*n). In these two data sets, the pure spectra and the concentrations have a correlation coefficient of one. They only differ by a certain scaling factor as defined by the diagonal matrix $\alpha$.

Booksh and Kowalski showed that Kubista's method can be expressed in terms of the Generalized Rank Annihilation Method (GRAM), which eliminates some problems and restrictions with Kubista's method (K. S. Booksh and B. R. Kowalski, J. Chemom. 8 (1994) 287–292). For details about the GRAM algorithm, see (E. Sanchez and B. R. Kowalski, Anal. Chem. 58 (1988) 496–499; B. Wilson, E. Sanchez and B. R. Kowalski, J. Chemom. 3 (1989) 493–398).

GRAM is mainly used as a calibration technique for techniques where a single sample results in a data matrix. The analysis of two mixture samples then results into the matrixes A and B with the relation described in Eqs. (2) and (3) for certain analytical techniques. Applications of GRAM and related techniques have been described for the excitation-emission matrices resulting from fluorescence spectroscopy (C. -N. Ho, G. D. Christian and E. R. Davidson, Anal. Chem. 50 (1978) 1108–1113; C. -N. Ho, G. D. Christian and E. R. Davidson, Anal. Chem. 52 (1980) 1071–1079; C. -N. Ho, Q. D. Christian and E. R. Davidson, Anal. Chem. 53 (1981) 92–96; M. M. C. Ferreira, M. L. Brandes, I. M. C. Ferreira, K. S. Booksh, W. C. Dolowy, M. Gouterman and B. R. Kowalski, Appl. Spectrosc. 49 (1995) 1317–1325); hyphenated techniques (L. S. Ramos, E. Sanchez and B. R. Kowalski, J. Chromatogr. 385 (1987) 165–180; J. Ohman, P. Geladi and S. Wold, Residual Bilinearization, J. Chemom. 4 (1990) 135–146; M. Josefson, L. Tekensbergs-Hjelte, Multicomponent analysis: a case report, J. Pharm. Biomed. Anal. 9 (1991) 643–654; M. J. P. Gerritsen, H. Tanis, B. G. M. Vandeginste, G. Kateman, Anal. Chem. 64 (1992) 2042–2056; M. J. P. Gerritsen, H. Peters, B. G. M. Vandeginste, G. Kateman, Chemometrics Intell. Lab. Syst. 18 (1993) 205–119) and time resolved spectral information of reactions (J. M. Henshaw, L. W. Burgess, K. S. Booksh and B. R. Kowalski, Anal. Chem. 66 (1994) 3328–3336). A major problem for practical applications is that the latter experiments need to be synchronized almost exactly and this type of calibration cannot be used as a routine method. For the application of GRAM to resolve mixture data, the same strict requirements need to be fulfilled. Furthermore, in an industrial environment only one sample of a certain class is often available, and to request another sample to fulfill the requirements of Eqs. (2) and (3) is not realistic.

As Antalek and Windig recently showed, problems such as synchronization of analyses and the availability of two samples can be avoided totally when data is available, where the signal of every component decays exponentially (B. Antalek, W. Windig, J. Am. Chem. Soc., 118, 1996, 10331–10332).

A simulated example of the exponential decays of two components with a different self-diffusion coefficient is given in following Table 1.

TABLE 1

| D | | A | | B | |
|---|---|---|---|---|---|
| 27 | 8 | 27 | 8 | 9 | 4 |
| 9 | 4 | 9 | 4 | 3 | 2 |
| 3 | 2 | 3 | 2 | 1 | 1 |
| 1 | 1 | | | | |

D represents a data set of which the exponentially decaying concentrations profiles of the two components are given in the first and second column under D. The first column has a faster decay than the second column. The data set A is created using the first three 'spectra' of data set D, and data set B is created by using the last three spectra of data set D. Because of the exponential character of the profiles, the first column of A is a constant (three) times the first column of column B, and the second column of A is a constant (two) times the second column of B. As a consequence, the data sets A and B fulfill the requirements as expressed in Eqs. (2) and (3). In this case the matrix $\alpha$ in Eq. (3) contains 0.33 and 0.50 as diagonal elements. This means that in the case of exponentially decaying functions, one can use two different parts of the data set to create the two data sets necessary to apply Kubista's method or GRAM.

MR image analysis

The DOSY technique mentioned above is not suited for image analysis, since the visual interpretation relies heavily on the spectral character of the data. The CORE technique is in principle suited for image analysis, but the computation time is prohibitive. It is in the range of hours for full spectra, for images the processing time would be at least an order of magnitude higher.

Sandor et. al. (T. Sandor, A. R. Bleier, P. W. Ruenzel, D. F. Adamns, F. A. Jolesz, Magnetic Resonance Imaging, 6, 1988, 27–40) described a maximum likelihood method to separate linear combinations of $T_2$ signals. Since resolving single exponential curves takes 40 to 60 seconds this method is too slow for the analysis of complete images. This method requires operator-interaction to identify linear segments in graphic displays of the measured data.

For image analysis several approaches have been described. A technique developed by Geladi utilizes PCA (H. Grahn, N. M. Szeverenyi, M. W. Roggenbuck, F. Delaglio, P. Geladi, Chemometrics and intelligent Laboratory Systems, 5, 1989, 311–322; H. Grahn, N. M. Szeverenyi, M. W. Roggenbuck, P. Geladi, Chemometrics and Intelligent Laboratory Systems, 7, 1989, 87–93; H. F. Grahn J. Saaf, Chemometrics and Intelligent Laboratory Systems, 14, 1992, 391–396). PCA is a technique that enables one to determine an efficient base for data. For example, when we have a data set of 15 mixture spectra of 3 components, where each spectrum has a 1000 wavenumbers, principal component analysis creates a base of only three vectors which described the whole data set. This is possible since the basic dimensionality of the data set is determined by the number of components, which is 3. Similarly, in a series of, for example, 15 images, the basic dimensionality may only be 2. In such case, the 15 images can be completely described by only two images. In this lower dimensional space, it is possible to determine clusters of pixels, i.e., pixels with are similar. These clusters of pixels can be defined interactively and these pixels can than be enhanced in images.

Hornak et al described a technique related to Geladi's. However, instead of using principal components as a base for the data set, Hornak uses the spin-lattice relaxation time $T_1$, the spin-spin relaxation time $T_2$ and the spin density p as a basis for the data set to determine clusters of pixels (L. M. Fletcher, J. B. Barsotti, J. P. Hornak, Mag. Res. Med., 29, 1993, 623–630). The techniques of Geladi and Hornak require user interaction to determine the clusters. Since the cluster are generally not well defined, these methods are subjective and time consuming.

There is thus a need for an image analysis method which obviates the disadvantages of the above-described techniques.

SUMMARY OF THE INVENTION

According to the present invention, there is provided a solution to the needs described above. Objects of the present invention are to provide an improved method for processing Magnetic Resonance Images (MRI's) to obtain separate images of different tissue/material type; to provide such a method based on exponential profiles; to provide quantitative information about the derived images; to compress the information of the original MRI's into a minimal number of images between which the differences are maximized, preserving all the information in the original data set; to provide a fast image processing method where the analysis of a series of 15 256×256 images should take less than one minute; to provide an image processing method that resolves the exponentials directly, rather than through iterative linear or non linear methods; and to provide an image processing method that does not require user interaction.

According to a feature of the present invention, there is provided a method of enhancing a series of images comprising the steps of: providing x digital image files, each image file including a matrix of n rows x m columns of pixels; producing a matrix of said x digital image files of x rows of m x n pixels per row, where each row is an unfolded image of an x digital image; splitting the produced matrix into two data sets A and B, each data set with an equal amount of images less than x; applying singular value decomposition (SVD) to data set A and limiting the SVD space to a number of expected components; calculating the projections $A^P$ and $B^P$ of data set A and data set B into the SVD space of A, with the eigenvalues of the SVD representing the projection of A; calculating the eigenvalues and eigenvectors of the product of $A^P$ and the inverse of $B^P$; and transforming the results of the latter calculation back to the original data set and calculating the resolved images and their contributions into the original images.

DETAILED DESCRIPTION OF THE INVENTION

Figure 3:
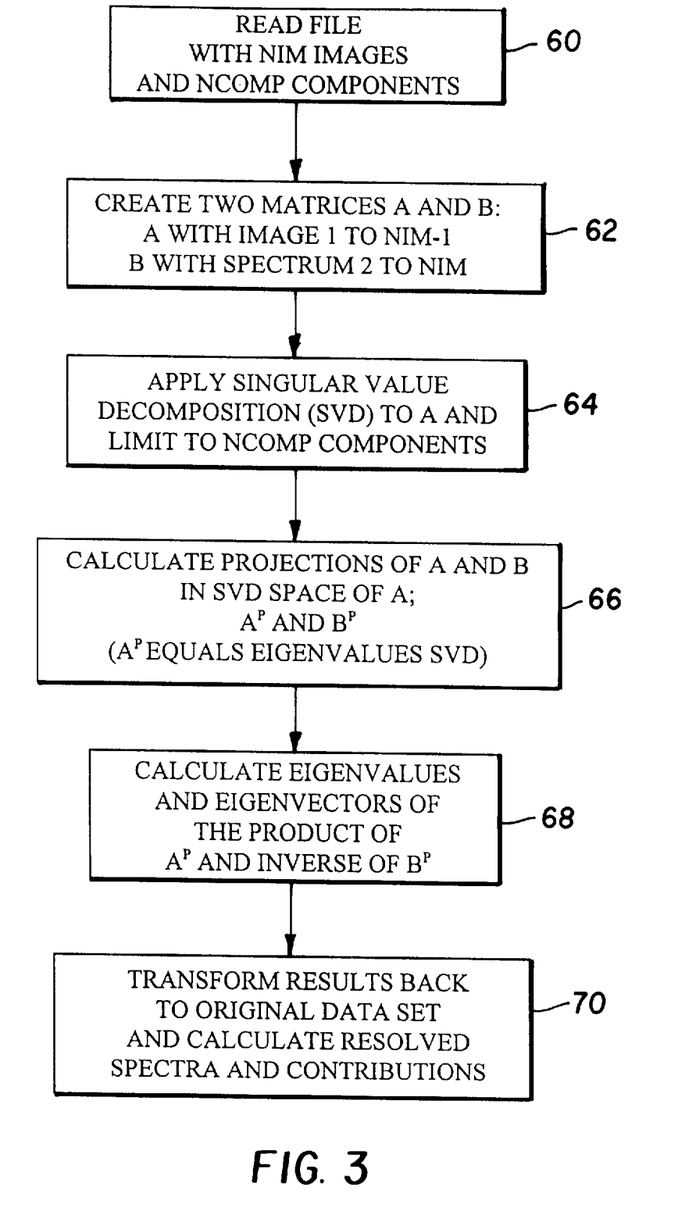
FIG. 3 is a flow diagram of the method of the present invention.

Referring to FIG. 2, the entire process of performing the image acquisition and obtaining results is illustrated. The following steps are taken:

1. place object into the MRI instrument (box 50);
2. scan the object using a routine localizing pulse sequence to locate the image plane of interest (box 52);
3. obtain the image series
   a. choose an appropriate pulse sequence to perform the imaging experiment
   b. select an appropriate range of sequence parameters which will cause the signal variance within the set of images to depend upon either of the properties, $T_1$, $T_2$, or $D_w$.
   c. collect a series of images based upon the sequence parameters (box 54);
4. store the images in a directory on a local computer (box 56); and
5. use the method of the invention illustrated in FIG. 3 and described to process the data (box 58).

In order to apply the method of the present invention for resolving MR spectra, it is necessary first to represent each image by an array rather than by a matrix. This can be done by so called unfolding. For the commonly used 256×256 matrix this is done by taking the first row of 256 elements, followed by appending the second, third etc. column, so that an array of 256×256 elements is obtained. This array is then stored as a row in the data matrix. After the unfolding procedure the data analysis developed for spectral data can be applied directly to the images.

Referring now to FIG. 3, there is shown a flow diagram of the method of the present invention.

1. Read the file with unfolded images; each unfolded image is stored as a separate row in the matrix. As a consequence, the size of the matrix for 15 images of each 256×256 pixels is 15×65536 (rows×columns) (box 60).
2. Split the file into two parts with an equal amount of images. For a data set as described above a good way to split is in a matrix A with images 1 to 14 and a matrix B with the images 2:15 (box 62).
3. Apply Singular Value Decomposition (SVD) to the first data set A in order to create a space into which both data files can be projected. Limit the dimensionality of the SVD space to the number of components expected (box 64).
4. Project both data sets into the common space. The eigenvalues of the SVD represent the projection of A. The notation of the projections is $A^P$ and $B^P$ (box 66).
5. Calculate the eigenvalues and eigenvectors of the product of $A^P$ and the inverse of $B^P$ (box 68).
6. Transform the results from the SVD based results back to the original space into the resolved images and their contributions into the original images (box 70).

The latter method in terms of equations can be described as follows.

Eqs. (2) and (3) can be rewritten as:

$$C = A(P^T)^+ \tag{4}$$

$$C\alpha = B(P^T)^+ \tag{5}$$

where $(P^T)^+$ represents the pseudoinverse of the matrix $P^T$.

Post-multiplying the left and right side of Eq. (4) by $\alpha$ results in:

$$C\alpha = A(P^T)^+ \alpha \tag{6}$$

Combining Eqs. (5) and (6) results in:

$$A(P^T)^+ \alpha = B(P^T)^+ \tag{7}$$

This can be rewritten as:

$$AZ\alpha = BZ \tag{8}$$

$$\text{where } Z = (P^T)^+ \tag{9}$$

The expression in Eq. (8) is known as the generalized eigenvector problem, where Z contains the eigenvectors and $\alpha$ contains the eigenvalues In order to solve Eq. (8), the matrices A and B need to be square. This can be achieved by using a common space in which both data files are projected. Several common spaces have been proposed in literature, depending on the properties of the data sets of A and B:

(2) The latent variables of A or B.
(3) The latent variables of A+B.
(4) The latent variables of the joint spaces of (A|B) and $$\left(\frac{A}{B}\right).$$

Approach (2) is the appropriate one for this study. A singular value decomposition was applied to A, after which only the significant results were kept: $\overline{U}$, $\overline{S}$ and $\overline{V}$ so that $\overline{USV}^T$ reproduces the original data set within the experimental noise range.

Substituting $\overline{USV}^T$ for A in Eq. (8) results in:

$$\overline{USV}^T Z\alpha = BZ \tag{10}$$

Substitute $Z = \overline{VS}^{-1} Z^*$, where $Z^* = \overline{SV}^T Z$. (This substitution uses the relation $Z = \overline{VV}^T Z$, which can be proven by using the fact that P is a linear combination of $\overline{V}$ and using properties of the generalized inverse.)

$$\overline{USV}^T \overline{VS}^{-1} Z^* \alpha = B\overline{VS}^{-1} Z^* \tag{11}$$

$$\overline{U} Z^* \alpha = B\overline{VS}^{-1} Z^* \tag{12}$$

Left multiplying by $\overline{U}^T$ results in $$Z^* \alpha = (\overline{U}^T B\overline{VS}^{-1}) Z^* \tag{13}$$

Since $\overline{U}^T B\overline{VS}^{-1}$ is a square matrix, this is the standard eigenvalue problem, where $Z^*$ are the eigenvectors and $\alpha$ are the eigenvalues.

From the eigenvectors $Z^*$ the spectra can be resolved as follows:

$$Z^* = \overline{SV}^T Z = \overline{SV}^T (P^T)^+ \tag{14}$$

$$\overline{V}^T (P^T)^+ = \overline{S}^{-1} Z^* \tag{15}$$

$$(P^T)^+ = \overline{VS}^{-1} Z^* \tag{16}$$

$$P^T = (\overline{VS}^{-1} Z^*)^+ \tag{17}$$

By use of the following definition:

$$A = CP^T = \overline{USV}^T \tag{18}$$

The concentrations can be derived as follows:

$$C = \overline{USV}^T (P^T)^+ \tag{19}$$

$$C = \overline{USV}^T Z \tag{20}$$

$$C = \overline{USV}^T \overline{VS}^{-1} Z^* \tag{21}$$

$$C = \overline{U} Z^* \tag{22}$$

Another representation of the method of the invention is given in the Appendix in the form of the MATLAB code. Some of the figures have been generated using this code.

It can be shown that the decay rate of the exponentials can be derived directly from the eigenvalue a. This is often done in order to determine parameters in eq. 1.

Data Transformations

The method of the invention requires profiles with the behavior expressed in eqs. (2) and (3). As shown in Table 1 above, this is the case for decaying exponentials. In MRI, other exponentials are used which do not behave according to eqs. (2) and (3). In these cases transformations can be applied to transform the data into a decaying exponential, so that the method of the invention can be applied. An example is the results of T1 experiments, which results in data with the following general equation:

$$\alpha_1 (1 - e^{-b_1 x}) \tag{23}$$

This signal does not have the properties described by eqs. (2) and (3). It is possible to transform this function into a sum of two exponentials by multiplying it with $$\alpha_2 e^{-b_2 x} \tag{24}$$

This results in:

$$\alpha_1 \alpha_2 e^{-b_2 x} - \alpha_1 \alpha_2 e^{(-b_1 - b_2)x} \tag{25}$$

A data set transformed this way will be rank deficient since we have basically only one equation with two unknown exponentials. In order to make it possible to resolve the data set an extra variable with the exponential character described by eq. (23) needs to be added to the data set. This transformation is also valid for data sets with more than one component The mathematical technique described above will resolve two exponentials; one with a decay rate of $b_1$, and one with a decay rate of $b_1 + b_2$. The resolved images obtained with the transformed data set can be used to calculate the T1 profiles of the original (untransformed) data set. In practice this is done by transforming the data set by a decaying exponential, and then add one column to the data set with this exponential. This data set can now be solved. For the final results the introduced resolved image needs to be ignored, and the remaining images can be used to calculate the contributions in the original data set.

EXAMPLE

Description MRI

Figure 4:
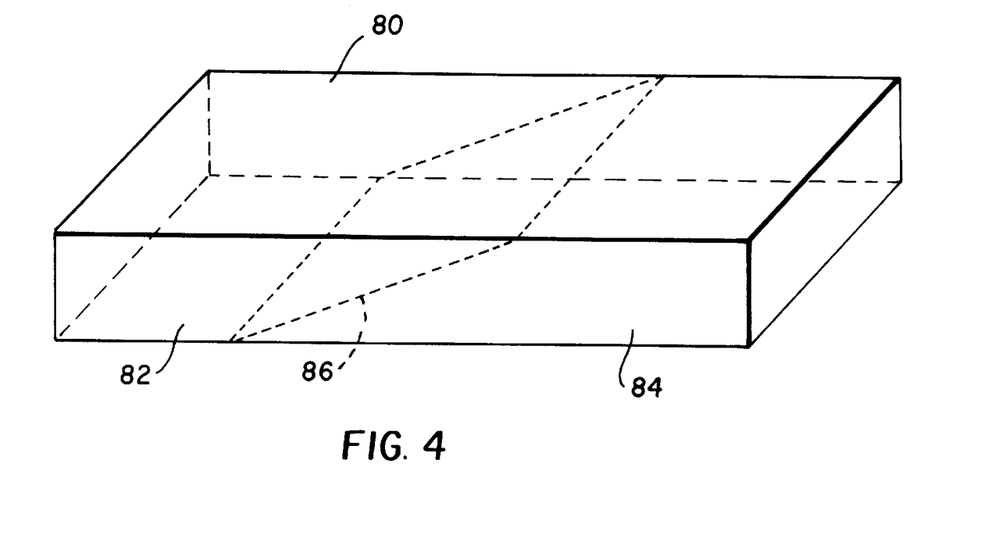
FIG. 4 is a diagrammatic view of the test phantom described in the illustrative example.

A test phantom was constructed to test the method of the invention and is shown in FIG. 4. This consisted of a PVC plastic box 80 with the dimensions, 18 cm×10 cm×1 cm, which contained two compartments 82 and 84 separated by a thin plastic sheet 86 of thickness, 0.18 cm. The compartments 82,84, therefore, formed two wedge-shaped spaces. The angle of the wedge is 6.2°. These spaces were filled with water which contained a measured amount of paramagnetic salt. One space contained 8 millimolar $NiCl_2$ and the other 0.5 millimolar $MnCl_2$. The separation sheet 86 was glued so as to completely seal one compartment 82 from the other 84. Large bubbles were removed and a top sealed with glue was affixed. The presence of the paramagnetic salt influences the $T_1$ and $T_2$ relaxation behavior exhibited by the water $^1H$ nuclei. The extent of this influence depends upon the amount of salt present.

Using a standard spin echo pulse sequence (i.e., g=0) 15, 256×256 pixel, images were acquired of a plane passing through long axes of the object. The parameter, TE, in the spin echo pulse sequence was varied starting at 15 milliseconds and incremented by 15 milliseconds for each image. TR was a constant of 2000 milliseconds and the field of view was 20 centimeters. Varying TE resulted in a dependence in signal intensity for each image based upon $T_2$ relaxation. The phantom was constructed so that one may obtain an image with three general regions, two regions where the signal represents the pure decay behavior of each component (close to the ends) and a middle region which represents a weighted sum of the two.

Data analysis

The images are unfolded and each image is stored in the matrix data as a row. Since the size of the original 15 images was 256×256, the matrix data has a size of 15 rows of each 65536. The pseudocode to analyze this data file is given in the appendix.

Figure 5:
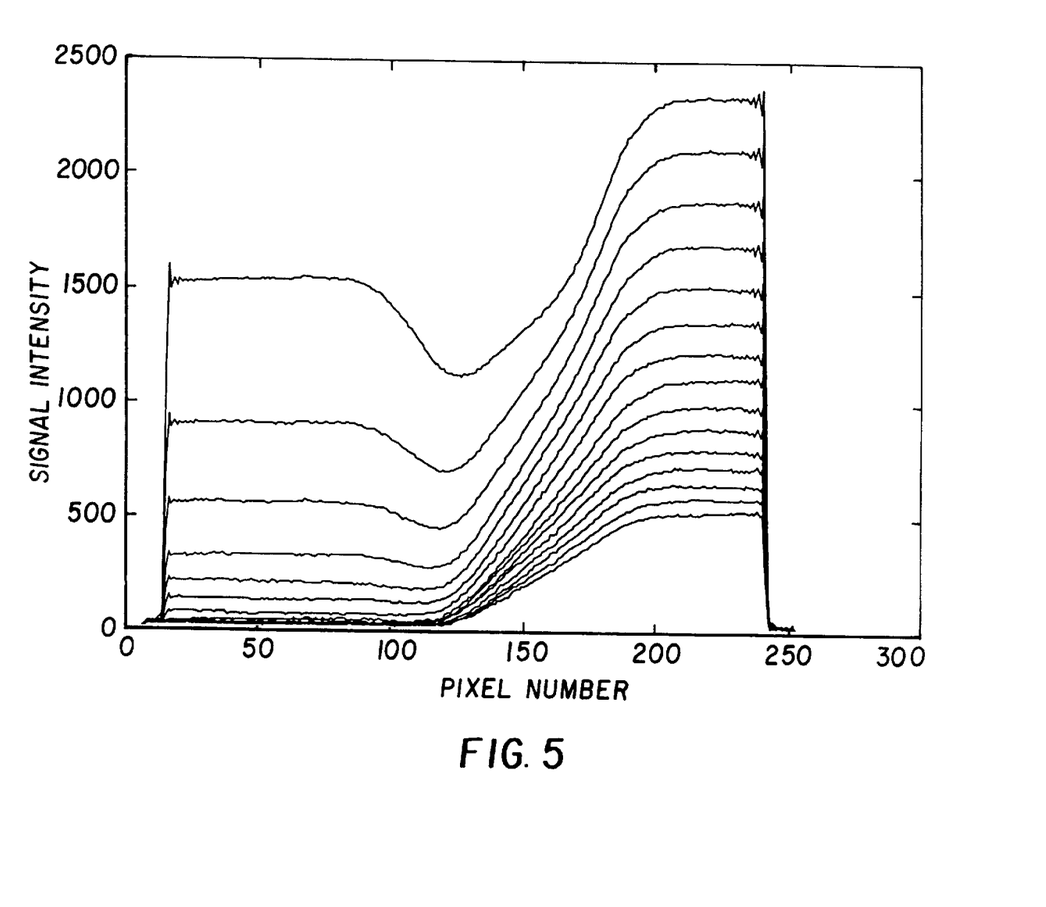
FIG. 5 are graphical views of signal profiles derived from the original images.
Figure 6:
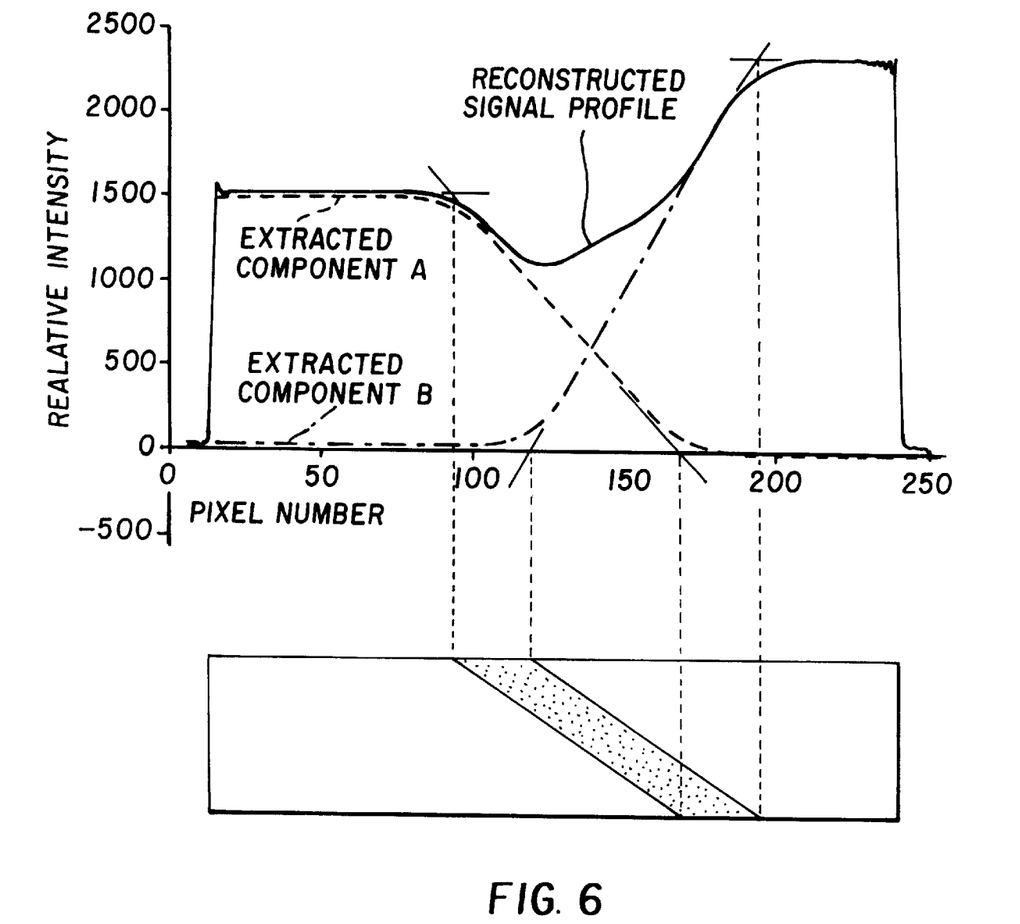
FIG. 6 are graphical views of resultant signal profiles showing extracted component A ----; Extracted component B -·-·-; Reconstructed signal profile for image #1—; Signal profile from image #1----.

Signal profiles are obtained from the original images by averaging 30 columns within each image comprising signal from within the phantom. These profiles are displayed in FIG. 5. Signal decays faster for the compartment containing $MnCl_2$ (i.e. the left hand portion of the curves in FIG. 5). The resolved images are obtained and their respective signal profiles plotted in FIG. 6 along with the signal profile reconstructed from the extracted components and that from image #1.

The analysis of this data set with a Matlab function on a 90 MHz Pentium computer with 64 Mb of RAM memory takes about 40 seconds.

The method of the present invention can be stored in a computer program product containing a computer readable storage medium having a computer program stored thereon of the method. The computer readable storage medium can include, for example: magnetic storage media (magnetic floppy disc, magnetic hard drive, magnetic tape); optical storage media (optical disc, optical tape, machine readable visual pattern, i.e., bar code); solid state electronic storage device (RAM, ROM); or any other physical device or medium which might be employed to store a computer program.

Although the image processing method of the invention has been described with respect to MRI images, it will be understood by those skilled in the art that the method is also applicable to other applications where a series of digital images in general, or medical images in particular, are to be processed.

The invention has been described in detail with particular reference to certain preferred embodiments thereof, but it will be understood that variations and modifications can be effected within the spirit and scope of the invention.

| PARTS LIST | |
|---|---|
| 10 | MRI system |
| 12 | magnet and detector assembly |
| 14 | system control |
| 16 | computer |
| 18 | magnet |
| 20 | subject |
| 22 | shim coil assembly |
| 23 | power supply |
| 24 | radio frequency antenna |
| 25 | power supply |
| 26 | gradient coils |
| 28 | pulse controller |
| 30,32,34 | power supplies and amplifiers |
| 36 | transceiver |
| 37 | power supply |
| 38 | amplifier section |
| 40 | computer/image processor |
| 42 | main console/image display |
| 80 | PVC plastic box |
| 82,84 | compartments |
| 86 | separation sheet |

APPENDIX

%Pseudo code to calculate images.
%The information that needs to be available is:
%data: a matrix in which each row contains an unfolded image
%       when the original image of 256*256 pixels is in a matrix M, the unfolded version of
%       M
%       in the first row of data is: M(1,1) M(2,1) M(3,1). . . M(256,1) M(1,2) M(2,2). . .
%       M(256,256)
%ncom: the number of components (pure images) to be resolved
%npixx: the number of pixels in the x direction (needed to fold results into images again to plot)
%In the notations used, A(1,:) means the first row of the matrix A.
%If the matrix range contains the values 1:4 (1,2,3,4), the matrix A(:,range) represents the first
%four columns of A
INITIALIZE
[nrows,ncols]=size(data);
range1=1:nrows-1;
range2=2:nrows;.
%SINGULAR VALUE DECOMPOSITION OF FIRST DATA SET
%LIMIT THE OUTPUT TO NCOM

APPENDIX

```
%u CONTAINS SCORES, v CONTAINS EIGENVALUES, v CONTAINS EIGENVECTORS
[u,s,v]=svd(data(range1,:));
s=s(1:ncom,1:ncom);u=u(:,1:ncom);v=v(:,1:ncom);
%CALCULATE EIGENVECTORS ev AND EIGENVALUES aa
[ev,aa]=eig(u'*data(range2,:)*v*inv(s));
%CALCULATE PURE IMAGES
purimage=pseudoinverse(v*inv(s)*ev);
%PLOT RESULTS IN FORM OF IMAGE
for i=1:ncom;
   plotimage(purimage(i,:));
end;
```

What is claimed is:

1. A method of enhancing a series of images comprising the steps of:

providing x digital image files, each image file including a matrix of n rows×m columns of pixels;

producing a matrix of said x digital image files of x rows of m×n pixels per row, where each row is an unfolded image of an x digital image;

splitting the produced matrix into two data sets A and B, each data set with an equal amount of images less than x;

applying singular value decomposition (SVD) to data set A and limiting the SVD space to a number of expected components;

calculating the projections $A^P$ and $B^P$ of data set A and data set B into the SVD space of A, with the eigenvalues of the SVD representing the projection of A;

calculating the eigenvalues and eigenvectors of the product of $A^P$ and the inverse of $B^P$; and transforming the results of the latter calculation back to the original data set and calculating the resolved images and their contributions into the original images.

2. The method of claim 1 wherein said providing step provides x medical digital images.

3. The method of claim 1 wherein said providing step provides x MRI digital images.

4. A computer program product, comprising:

a computer readable storage medium having a computer program stored thereon for performing the steps of:

providing x digital image files, each image file including a matrix of n rows×m columns of pixels;

producing a matrix of said x digital image files of x rows of m×n pixels per row, where each row is an unfolded image of an x digital image;

splitting the produced matrix into two data sets A and B, each data set with an equal amount of images less than x;

applying singular value decomposition (SVD) to data set A and limiting the SVD space to a number of expected components;

calculating the projections $A^P$ and $B^P$ of data set A and data set B into the SVD space of A, with the eigenvalues of the SVD representing the projection of A;

calculating the eigenvalues and eigenvectors of $A^P$ and the inverse of $B^P$; and transforming the results of the latter calculation back to the original data set and calculating the resolved images and their contributions into the original images.

\* \* \* \* \*